Sept. 4, 1956  R. H. FISH  2,761,731
AGRICULTURAL SPRAYING MACHINE
Filed July 1, 1952  5 Sheets-Sheet 1

INVENTOR.
Richard H. Fish
BY
*Thomason and Lane*
HIS ATTORNEYS

Sept. 4, 1956

R. H. FISH 2,761,731

AGRICULTURAL SPRAYING MACHINE

Filed July 1, 1952

INVENTOR.
Richard H. Fish
BY
Hansen and Lane
HIS ATTORNEYS

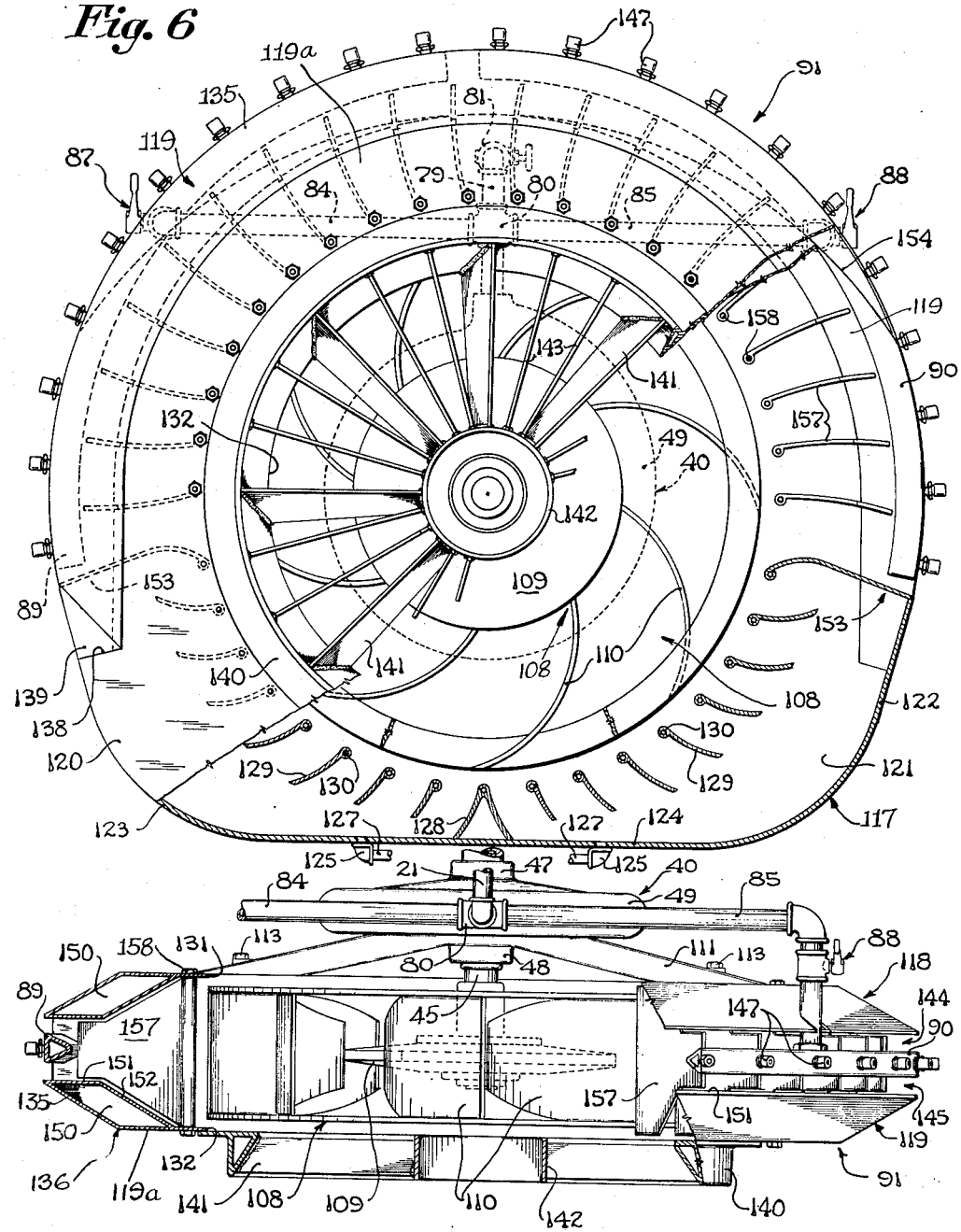

Sept. 4, 1956  R. H. FISH  2,761,731
AGRICULTURAL SPRAYING MACHINE
Filed July 1, 1952  5 Sheets-Sheet 4
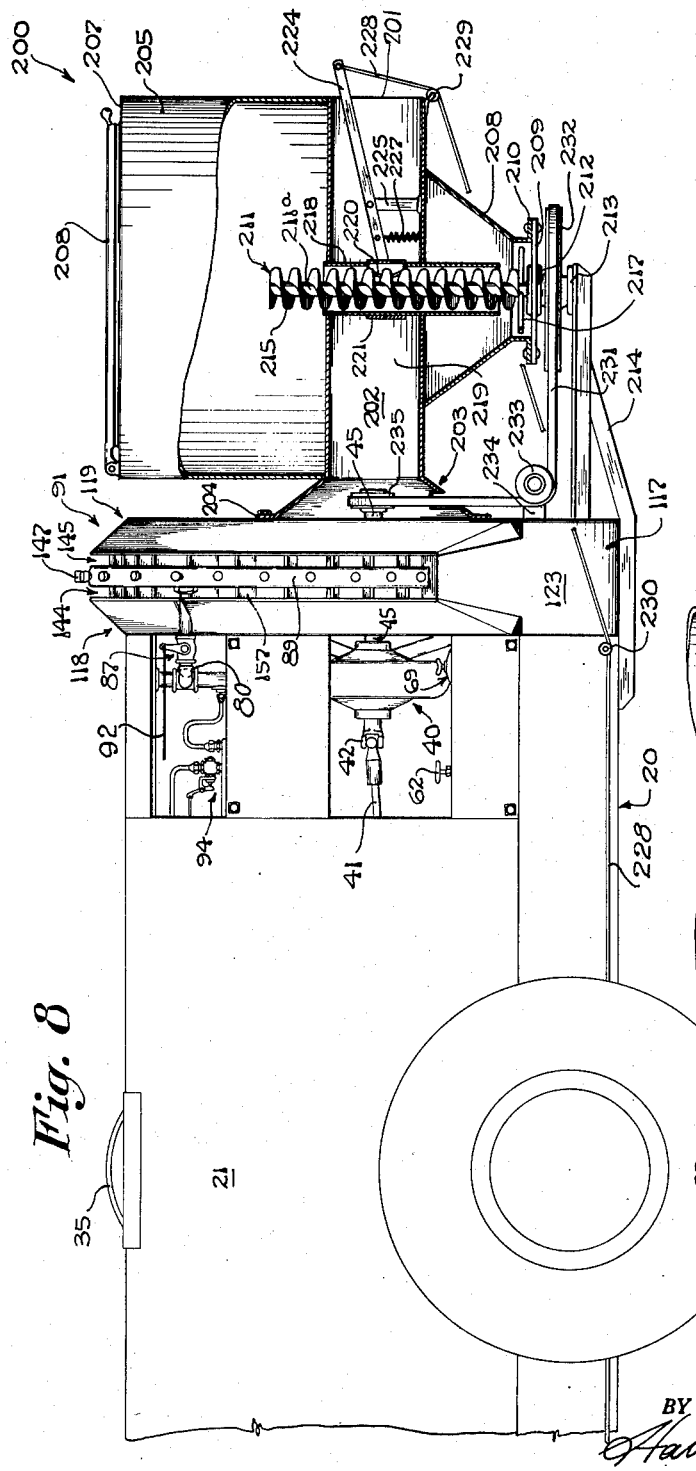
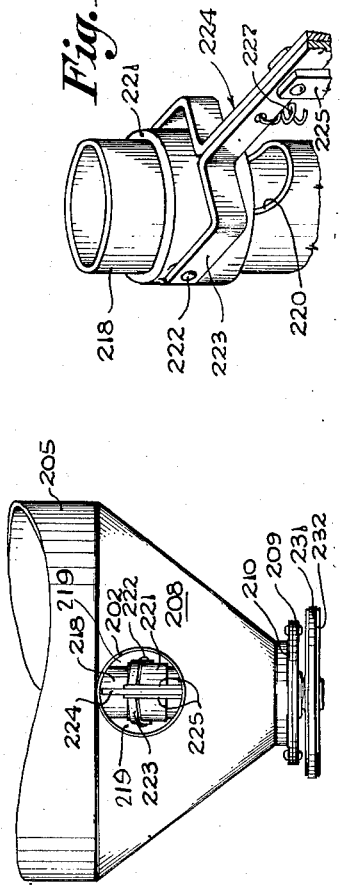
INVENTOR.
Richard H. Fish
BY
Hansen and Lane
HIS ATTORNEYS

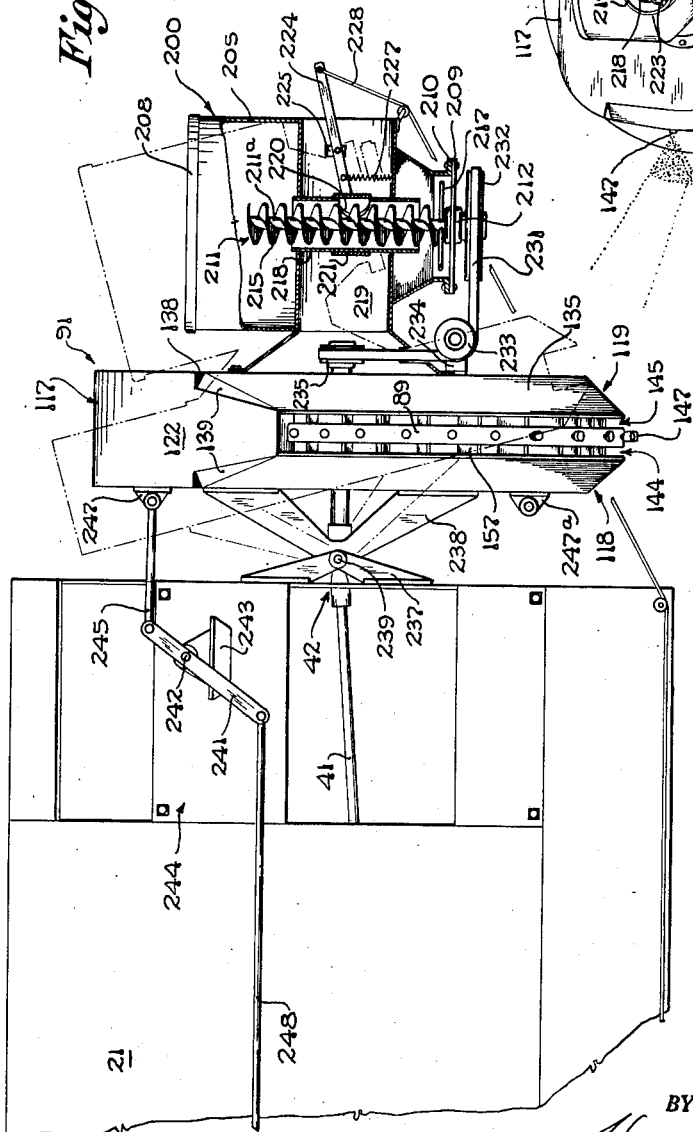

United States Patent Office 2,761,731
Patented Sept. 4, 1956

2,761,731

AGRICULTURAL SPRAYING MACHINE

Richard H. Fish, Morgan Hill, Calif., assignor of one-half to Evalyn Preston, Morgan Hill, Calif.

Application July 1, 1952, Serial No. 296,580

7 Claims. (Cl. 299—37)

The present invention relates to horticultural sprayers, and pertains more particularly to a sprayer of the type having a fan arranged to discharge a fan shaped air blast radially of the fan axis, and to introduce finely divided material to the air blast.

The invention contemplates the provision of a simple, improved spraying mechanism of the air-borne spray type. Further, the invention provides for deflecting a portion of the air blast discharged by a centrifugal fan, and for diverting the deflected portion into the main air blast at a zone circumferentially remote from its point of original discharge. It is also an object of the invention to provide an improved housing for a radial discharge fan.

The invention also provides for inverting and tilting the fan assembly for spraying and dusting row crops. A further object of the invention is to provide improved pump priming means for a horticultural spraying machine. The invention further contemplates the provision of an agricultural spraying machine having improved liquid straining means.

These and other objects and advantages of the invention will be apparent from the following description and the accompanying drawings, wherein:

Fig. 6 is an enlarged, rear elevational view of the blower fan assembly, parts being broken away to illustrate interior structural features.

Fig. 7 is a sectional view of Fig. 6.

Fig. 8 is a side elevational view of the rear portion of a trailer similar to that shown in Fig. 1 with a dust feeding arrangement mounted thereon.

Fig. 9 is a fragmentary rear elevational view showing a portion of the dust feeding mechanism of Fig. 8.

Fig. 10 is an enlarged perspective view of a dust feeding pipe and a dust discharge control arrangement therefor.

Fig. 11 is a view similar to the right hand portion of Fig. 8, but showing a modified arrangement, the blower fan housing being inverted, and the entire blower fan assembly being tilted for use in spraying and dusting row crops.

Fig. 12 is a rear view of the arrangement shown in Fig. 11.

Figure 1:
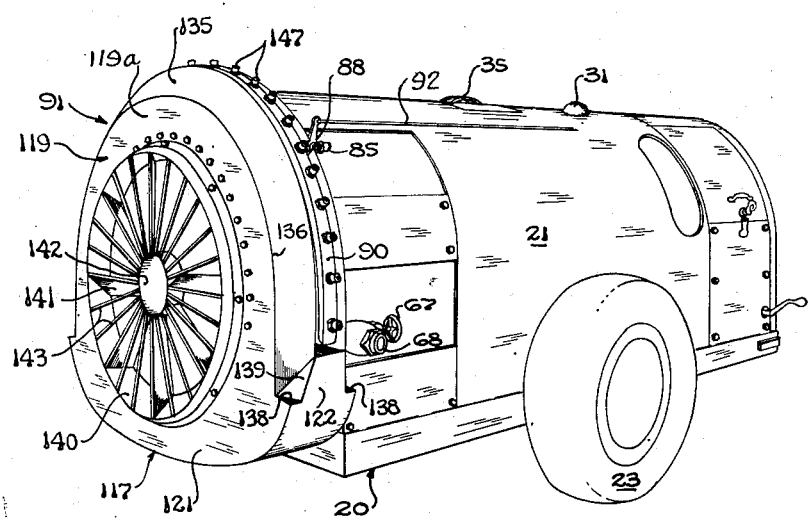
Fig. 1 is a perspective view of a sprayer embodying the present invention.
Figure 2:
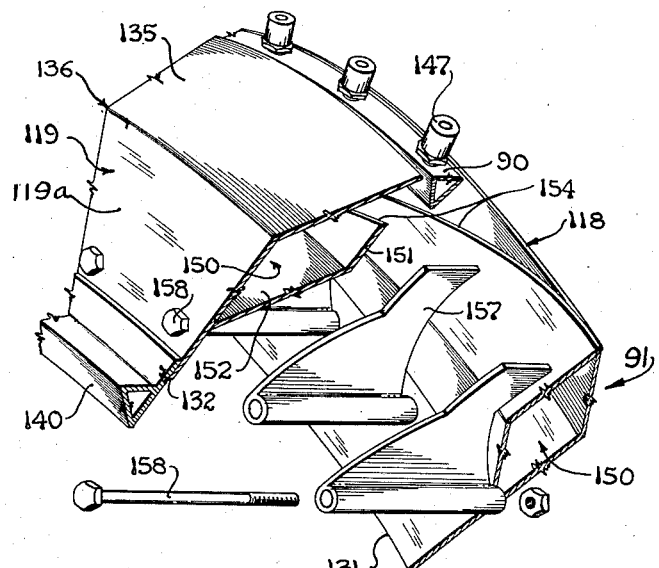
Fig. 2 is a fragmentary perspective view, in enlarged scale, of a portion of a fan housing embodying the present invention.
Figures 3, 4, 5:
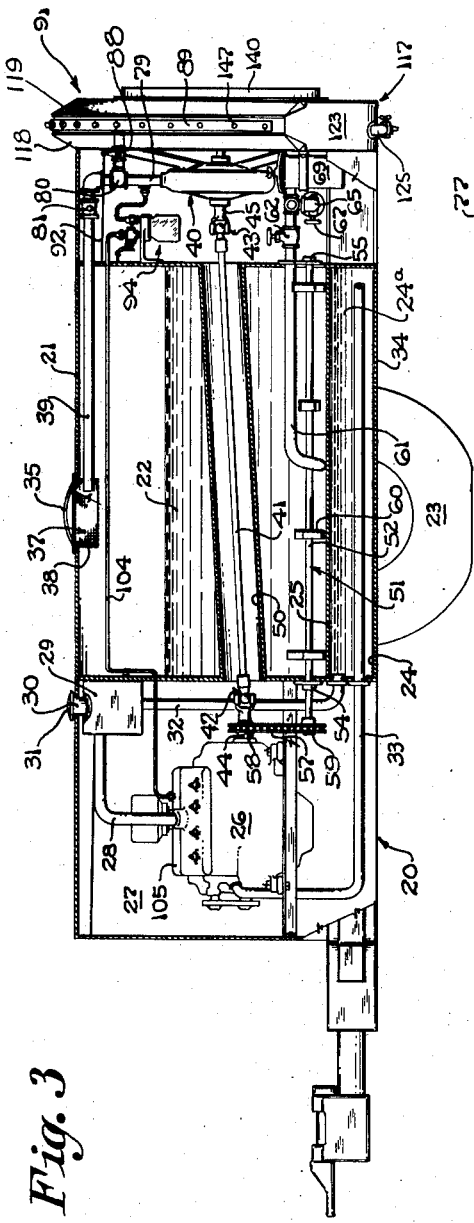
Fig. 3 is a vertical, longitudinal sectional view of the sprayer shown in Fig. 1.
Fig. 4 is an enlarged fragmentary view of a vacuum primer and portions of connecting pipe and tubing therefor, the primer being shown in vertical section, and a portion of a pump outlet pipe being broken away.
Fig. 5 is an enlarged, fragmentary, side elevational view of a strainer assembly, the strainer housing being broken away on a vertical mid-plane.

Referring to Figs. 1 and 3 of the drawings, a usual trailer chassis 20 has a main tank 21 for containing spraying liquid 22 centered over the wheels 23 thereof. A coolant compartment 24 is formed in the lower portion of the main tank 21 by a horizontal partition 25 which seals this compartment 24 off from the remainder of the main tank. A conventional liquid cooled, internal combustion engine 26 is mounted in a compartment 27 at the forward end of the main tank 21. A riser pipe 28 is connected from the usual water jacket (not shown) of the engine 26 to an expansion tank 29 mounted on the forward end of the main tank 21.

A usual filler neck 30 and cap 31 are provided on the expansion tank 29. From the lower end of the expansion tank 29 a pipe 32 opens into the forward end of the coolant compartment 24, and is sealed to the main tank 21 to prevent the escape of liquid between the tank 21 and the pipe 32. A return pipe 33 is similarly sealed in an opening into the coolant compartment 24, and extends lengthwise of the compartment 24 to a point near the rear end thereof. The forward end of the return pipe 33 is connected to a low portion of the engine water jacket. Thus, when the engine is running a convection circulation of coolant liquid 24a is established from the water jacket of the engine 26, through the riser pipe 28, the expansion tank 29, the downwardly extending pipe 32, thence lengthwise of the coolant compartment 24 and through the return pipe 33 back into the water jacket of the engine 26. Heat transfer from the coolant liquid 24a in the compartment 24 through the tank bottom 34 to the atmosphere; and also through the partition 25 into the spraying liquid 22 in the main tank 21, and thence through the wall of the main tank 21 to the atmosphere, prevent the liquid in the cooling system from reaching excessive temperatures.

This heat transfer into the spraying liquid also warms the liquid 22 in the main tank 21 which is frequently desirable, especially in winter when using oil spray material.

A filler cap 35 is provided to cover a usual filler opening 37 in the top of the main tank 21, and a cup shaped screen 38 is fitted into the filler opening 37 to strain out foreign material from liquid used for filling the main tank. A pipe 39 for filling the main tank 21 opens into the cup shaped screen 28 from a spray material pump 40 mounted in a compartment 41 at the rear of the main tank 21 in a manner to be described later herein.

The pump 40 is of a conventional, centrifugal discharge type, and is driven from the engine 26 by a drive shaft 41 having universal joints 42 and 43 at its front and rear ends, respectively. The front universal joint 42 connects the engine crank shaft 44 to the drive shaft 41, while the rear universal joint 43 connects the drive shaft 41 to the impeller shaft 45 of the pump 40. The pump shaft 45 has a usual impeller, not shown, secured thereto. The pump shaft 45 is journalled in bearings 47 and 48 (Fig. 7) mounted on the front and rear ends, respectively, of the housing 49 of the pump 40.

The drive shaft 41 slopes downwardly toward its forward end, and passes through a tunnel tube 50 mounted at a corresponding slope to extend lengthwise through the main tank 21. The front and rear ends of the tunnel tube 50 are sealed to the tank 21 as by welding. An agitator 51 for agitating the contents of the main tank 21 comprises a shaft 52 journaled in sealed bearings 54 and 55 mounted in opposite ends of the main tank 21. The agitator is driven from the engine 26 by a conventional type of drive chain 57 which is trained around sprockets 58 and 59 secured to the engine crank shaft 44 and to the agitator shaft 52, respectively. Stirring blades 60 are secured to the agitator shaft 52 at spaced intervals throughout the length of the main tank 21.

An intake pipe 61 for supplying spraying liquid from the main tank 21 to the pump 40 opens from a low point in the main tank and passes through an opening provided therefor in the rear end of the tank 21. The pipe 61 is sealed to the tank to prevent liquid leakage between the tank and the pipe 61. A manually controlled valve 62 is provided in the pipe 61 ahead of a T 64 therein. From the downwardly directed side outlet of the T 64 (Fig. 5), a pipe 65 having a manually controlled valve 67 therein extends laterally and terminates (Fig. 1) in a hose connection fitting 68 for connecting thereto a usual suction hose, not shown, for filling the main tank 21 from an available water supply, such as an irrigation ditch, pond, or other suitable source.

The other end of the T 64 from that to which the pipe 65 is connected, is connected (Fig. 5) to the intake side of a strainer housing 69. The strainer housing 69 has a cup shaped strainer screen 70 inserted therein. The strainer screen 70 has a radially outwardly extending rim 71 surrounding its upper end, the rim 71 resting on an inwardly extending flange 72 provided around the interior of the strainer housing 69. A cover plate 74 is fitted onto the upper end of the strainer tank 69, and is secured thereon by a conventional clamp bar 75 and wing screw 77. From the lower end of the strainer housing 69 a pipe 78 is connected to open into the intake side of the pump 40.

From the upper or discharge side of the pump housing 49 (Figs. 6 and 7), a discharge pipe 79 is connected to one run of a cross 80, to one end of the other run of which the tank filling pipe 39 is connected by usual fittings, including a pressure release valve 81.

From the laterally directed outlets of the cross 80, laterally extending pipes 84 and 85 are connected through valves 87 and 88, respectively, to a pair of quadrantal spray manifolds 89 and 90 mounted in a fan housing 91 in a manner to be described later herein. The valves 87 and 88 are of the normally spring closed, lever type, and are provided with lanyards 92 (Fig. 1) which extend forwardly within reach of the tractor operator.

For priming the pump 40, a suction primer 94 comprises a bracket 95 (Figs. 3 and 4) mounted on the rear end of the spray material tank 21. The bracket 95 has a downwardly extending internally threaded annular flange 97 thereon for threaded engagement with the neck of a jar 98 such as a conventional fruit jar. A gasket 99 seals the connection between the bracket 95 and the jar. A pair of threaded fittings 100 and 101 are screwed into threaded holes provided therefor in the bracket 95 to open into the mouth of the jar 98. A tube 102 is connected from the righthand fitting 101 as shown in Fig. 4 to open into the previously described discharge pipe 79 from the outlet of the pump 40. A spring pressed, normally closed, lanyard operated valve 103 is mounted on the other or lefthand fitting 100, and a tube 104 is connected from the valve 103 to open into the air intake manifold 105 of the engine 26.

Thus, when the engine 26 is operating, the pump 40 may be primed, or the discharge pipe 79 may be purged of air, by manipulating the lanyard 107 to open the valve 103, and thus to apply the suction inherently present in the engine intake manifold during engine operation to the interior of the jar 98 and thence to the pump discharge pipe 79. When liquid appears in the jar 98 it indicates that the pump is primed. The jar may be unscrewed from the bracket 95 and the liquid emptied therefrom as required.

A centrifugal blower fan wheel 108 (Figs. 6 and 7) is mounted on the rear end of the pump impeller shaft 45 which extends rearwardly beyond the pump housing 49. The fan wheel 108 comprises a disk-shaped hub portion 109, and curved, radially extending blades 110.

To insure accurate alignment of the fan wheel 108 and the fan housing 91, a plurality of rearwardly sloping arms 111 are provided on the rear of the pump housing 49 to extend radially of the pump shaft 45. The outer ends of the arms 111 are secured by bolts 113 to the fan housing 91.

The fan housing 91 (Figs. 1, 2, 3, 6 and 7) which is an important feature of the present invention, comprises a base portion 117, and similar, but reversed, circularly curved front and rear upper portions 118 and 119 mounted thereon. The base portion 117 has front and rear walls 120 and 121 (Fig. 6) of sheet metal, curved side walls 122 and 123, and a flat bottom 124. Usual drain valves 125, 125 are provided in the bottom 124, and if desired these drain valves may be connected by tubes 127 to open into the intake side of the pump 40 to draw any accumulation of liquid in the base 117 back into the pump for re-delivery to the spray nozzles.

An inverted V-shaped dividing baffle 128 having slightly convexly curved side walls, is mounted in the center of the bottom 124 to extend between the front and rear walls 120 and 121. This baffle 128 is of a height to clear the fan blades 110 during fan rotation.

A plurality of curved deflector vanes 129 (Fig. 6) are mounted on individual supporting bolts 130 inserted through pairs of aligned holes in the front and rear walls 120 and 121 of the fan housing base portion 117. The vanes 129 on opposite sides of the V-shaped divider 128 are mounted with their concave sides directed laterally outwardly. The vanes 129 after initial pivotal adjustment to desired positions about the bolts 130 as pivots are welded to the housing to prevent displacement. The vanes 129 are adjusted to proper angular positions to direct laterally outwardly toward opposite sides of the fan housing the two portions of the air blast from the fan wheel which are divided by the baffle 128.

Circular air intake openings 131 and 132 are provided in each of the front and rear housing portions 118 and 119 to admit air into the housing 91 on both sides of the fan wheel 108.

The upper rear fan housing portion 119 has a flat rear wall element 119a thereof formed contiguously with the rear wall 121 of the base portion 117, as best shown in Fig. 1. A radially outer marginal wall element 135 is disposed at an obtuse angle to the rear wall element 119a to form a bevel 136 peripherally of the upper rear housing portion 119 (Figs. 1, 2, 3, 6 and 7). The juncture of each rectangular corner (Fig. 1) formed by the intersection of the front and rear walls 120, 121 and side wall 122 of the fan housing base portion 117 with the beveled portion 136 of the upper housing portion is sealed by two triangular filler plates 138 and 139, fitted in place in a manner customary in sheet metal working. The contours of these parts may of course, vary widely with different methods of manufacture. An annular shroud 140 surrounds the rear air intake opening 132 into the fan housing 91.

A plurality of air guiding vanes 141 are mounted to extend radially from a central hub portion 142 to the shroud ring 140. The vanes 141 are disposed at a desired angle, relative to the plane of fan wheel rotation, to direct air into the housing 91 and to prevent pre-rotation of the incoming air. A plurality of radial guard bars 143 also are provided to form a protective shield over the entrance to the fan housing.

The upper housing portions 118 and 119 are spaced from each other (Figs. 1, 2, 3, 6 and 7) to receive the nozzle supporting, quadrantal, liquid manifolds 89 and 90 therebetween, and to provide air discharge spaces 144 and 145 (Fig. 7) on opposite sides of the manifolds 89 and 90. While illustrated as of triangular cross sectional shape, the manifolds 89 and 90 may be of other shapes, such as of streamlined or oval section. A plurality of conventional spray nozzles 147 are mounted at spaced intervals along the radially outer sides of the manifolds 89 and 90 to discharge spray jets 148 (Fig. 12) into the air blasts issuing from the spaces 144 and 145 (Fig. 7) on each side of the manifolds 89 and 90. The pressure release valve 81 is spring loaded to maintain desired pressure at the nozzles, and to permit excess liquid to bypass back into the tank 21 through the pipe 39. The bypass valve 81 also prevents excessive back loading on the pump 40, and allows liquid to flow into the tank when using the pump for filling the tank through the hose fitting 68 and valve 67, as described previously herein. If desired, the valve 81 may be of a well known type which permits the spring loading to be released when desired, for example when filling the tank.

A curved air conduit 150 for conducting the air diverted laterally toward both sides of the base 117 by the inverted V-shaped baffle 128 and the vanes 129 and discharging this air into the main air blast, is provided interiorly of the beveled radially outer edge of each of the front and rear upper housing portions 118 and 119. Since both curved air conduits 150 are similar to each other, only that on the rear upper housing portion 119 will be described. This rearmost air conduit 150 is formed by a longitudinally curved flat plate 151 (Figs. 2, 6 and 7) mounted parallel to, and spaced forwardly from, the flat rear plate 119a of the rear upper housing portion 119. A second curved plate 152 also is mounted parallel to, and spaced radially inwardly from, the plate 135 which forms the peripheral bevel 137 on the rear upper housing portion 119. These two plates 151 and 152 are secured together and to the upper housing plates 119a and 135 to form the conduit 150 which is of parallelogram cross sectional configuration as shown at the left hand side of Fig. 7.

The conduits 150 are open at their lower ends 153, 153 (Fig. 6) on both sides of the fan housing 91 to receive the blasts of air diverted laterally toward them by the baffle 128 and vanes 129. The flat, curved plate 151 forming the inner side of the conduit nearest the nozzle manifolds 89 and 90 has its radially outer marginal portion cut away on a circular curve as indicated by the line 154 (Figs. 2 and 6) to provide an opening of gradually increasing size as it approaches the top of the housing. Through the opening thus provided the blasts of air in the conduits 150 will be fed into the radially outwardly directed main blast of air from the fan wheel 108 issuing from the spaces 144 and 145 between the upper housing portions 118 and 119 and the nozzle manifolds 89 and 90.

A plurality of curved, air directing vanes 157 (Figs. 2, 6 and 7) are mounted on individual bolts 158 inserted through aligned pairs of holes in the front and rear upper housing portions 118 and 119. Upon loosening the bolts 158 upon which they are mounted, these vanes 167 may be adjusted about their bolts as pivots, and may be secured in adjusted position by again tightening the bolts.

Operation

The operation of the structure shown in Figs. 1 to 7 inclusive is as follows:

A supply of coolant liquid 24a (Fig. 3) is supplied through the filler neck 30 to fill the lower compartment 24, the water jacket of the engine 26, the pipes 28, 32 and 33 and the expansion tank 29.

The main spray material tank 21 then may be filled with a suitable spraying liquid, which may be either premixed, or may be made up by adding suitable ingredients to a supply of water in the main tank 21. If the spraying liquid material or water to be introduced into the main tank 21 is under pressure, so that it will flow in through the screened opening 37 at the top of the main tank 21, the main tank may be filled while the engine 26 is at rest.

Otherwise, if it becomes necessary to pump liquid into the tank 21 from a supply thereof below the level of the tank, a suction hose, not shown, of a conventional type may be attached to the hose connection 68 (Figs. 1 and 3), and the free end of the hose inserted in the supply of liquid from which the tank is to be filled. The engine 26 then may be started, the valve 62 closed, and the valve 67 opened. Also, if the valve 81 is of the type which permits removal of the spring loading, this also may be done. The pump 40 then will tend to draw liquid in through the pipe 65 and to pump the liquid through the pipe 65 and the strainer 38 into the main tank 21 through the pipe 39.

In the event the pump 40 requires priming, the lanyard 107 may be pulled to open the valve 103 and thus to apply suction from the low pressure zone of the engine intake manifold 105 to the interior of the pump through the tube 104, the sump jar 98, the tube 102 and the discharge pipe 79. For this purpose, it usually will be necessary to have the valve 81 spring loaded to urge it to closed position until the pump is primed, which will be indicated by the discharge of water through the tube 102 into the jar 98.

As soon as the pump 40 is primed, the lanyard 107 may be released to permit the spring biased valve 103 to close, whereupon the spring loading may be removed from the valve 81 to permit the liquid to be discharged through the pipe 39 and the strainer 38 into the tank 21. Rotation of the stirring blades 60 on the agitator shaft 52 upon operation of the engine 26 insures a thorough mixing of ingredients which may be added with the spraying liquid 22, and prevents the collection of sediment on the bottom of the main tank.

After the main tank 21 has been filled, and the spraying liquid is ready for use, the valves 67 and 81 are closed, and the valve 62 is opened to permit a flow of spraying liquid from the main tank 21 through the strainer housing 69 and the pump 40 to the lanyard actuated, normally spring closed valves 87 and 88.

The apparatus then is drawn by a usual tractor, not shown, to the point in an orchard or field where the spraying operation is desired to commence. By opening the lanyard actuated valves 87 and 88, spray material will be forced under pressure into the quadrantal manifolds 89 and 90 and thence radially outwardly through the spray nozzles 147. The air blast from the upper portion of the fan wheel 108 will be discharged substantially radially outwardly in a fan shaped blast to carry the spray particles from the nozzles outwardly on to the vegetation to be sprayed. The lower portion of the blast will be divided by the V-shaped baffle 128 and the vanes 129 into the curved conduits 150. Thence, the air will be released from the conduits 150 into the main air blast through the openings provided by the cut-away marginal portions 154 of the inner walls 151 of these air conduits.

In the modified form of the invention shown in Figs. 8 and 9, a dust feeding assembly 200 comprises an air intake duct 201 having a main tubular portion 202, and an outwardly flared, conical front portion 203 with a surrounding flange 204 thereon. The flange 204 is bolted to the rear side of the fan housing 91 to replace the shroud ring 140 (Figs. 6 and 7). The tubular portion 202 of the air intake duct 201 is welded to extend through, and to support, a dust hopper 205. The hopper 205 has a cylindrical upper portion 207 with a lid 208 hingedly mounted over a usual filling opening (not shown) in the upper end of the hopper. The lower portion 208 of the hopper is tapered downwardly, and a bottom closure 209 is bolted to a radially extending flange 210 surrounding the lower end of the hopper.

A dust elevator screw 211 has the shaft 211a thereof journaled in a dust sealed thrust bearing 212 mounted centrally of the bottom closure plate 209, and also in a second bearing 213 mounted in a bracket 214 secured to the under side of the fan housing 91 to extend rearwardly therefrom.

A dust agitator rod 217 is inserted through a hole provided therefor transversely through the elevator shaft 211a just above the bottom plate 209, and is secured therein by welding. The shaft 211a has a helical elevator flight 215 thereon, and is mounted to rotate within a tubular elevator casing 218. The casing 218 (Fig. 8) is welded to extend vertically through the air intake tube 202 (Figs. 8 and 9), and is of substantially smaller diameter than the latter to provide air passages 219, 219 (Fig. 9) on both sides of the elevator casing tube 218.

A dust discharge orifice 220 is provided in a side of the tubular elevator casing 218 within the air intake tube 202. Discharge of dust through this opening 220 is controlled by a valve sleeve 221 slidably surrounding the elevator casing 218 and of a width to cover the hole 220 when centered thereon.

The valve sleeve 221 has trunnion posts 222 provided one on each side thereof for pivotal connection to the yoked end portion 223 of a sleeve actuating lever 224. The lever 224 is pivotally mounted on a standard 225 welded to extend upwardly from the bottom of the air intake tube 202, and normally is held in aperture-closing position by a coil spring 227 mounted in tension between the bottom of the air intake tube 202 and the lever 224. A lanyard 228 is connected to the rear end of the lever 224, is trained around pulleys 229 and 230, and thence extends forward to a position within reach of the tractor operator.

For driving the elevator screw 211, a belt 231 is trained around a grooved pulley 232 mounted near the lower end of the elevator shaft 211a, and passes beneath idler pulleys 233 mounted on brackets 234 secured to extend rearwardly from the lower portion of the fan housing 91. Thence the belt 231 passes upwardly and is trained around a grooved pulley 235 secured to the rear end of the pump and fan shaft 45. Other portions of the structure shown in Fig. 8 are similar to those described for the structure shown in Figs. 1 to 7 inclusive, and are designated by the same numerals applied to such portions in Figs. 1 to 7.

A further modified form of the invention is shown in Figs. 11 and 12. In the latter views, parts corresponding to parts illustrated in Figs. 1 to 7 inclusive will be designated by the same numerals as are applied to these parts in Figs. 1 to 7 inclusive. The fan housing 91 is inverted, so that the arcuate discharge openings 144 and 145 of the fan housing are directed downwardly, instead of upwardly as shown in Figs. 1, 3 and 8. To avoid confusion, the portion 117 of the fan housing 91 will be referred to as the "base" in all positions of the housing.

As shown in broken lines in Figs. 11 and 12, the fan housing 91 is tilted forwardly at its upper (base) end, so that the fan-shaped air blast issuing from the housing 91 will be directed angularly rearwardly and downwardly. The housing 91 is mounted to tilt about a horizontal axis on trunnion bracket members 237 and 238. The trunnion axis 239 passes through the rear universal joint 42, so that the tilt angle of the housing 91 may be adjusted without interfering with the operation of the fan and dust feeding mechanism. The liquid spray mechanism in the structure shown in Figs. 8, 11 and 12 is similar to that shown in Figs. 1 to 7 inclusive, and described previously herein. Either spray or dust may be used selectively as desired with the mechanisms shown in Figs. 8, 11 and 12.

Means for adjusting the tilt angle of the housing 91, and the parts assembled thereon, as shown in Figs. 11 and 12, comprises a lever 241 mounted on a pivot pin 242 on a side member 243 of the rear compartment 244 of the trailer. The lever 241 is connected by a link 245 to a bracket 247 secured to the fan housing 91.

A second bracket 247a, similar to the bracket 247 is mounted on the housing 91 diametrically opposite from the bracket 247, and at an equal distance from the combined pump and fan shaft 45. The purpose of the second bracket 247a will be described later herein. A control rod 248 extends forwardly from the lower end of the tilt control lever 241 to which it is pivotally connected. The control rod 248 is moved axially to swing the lever 241 and thereby to tilt the housing 91 to a desired angle by suitable mechanism of a conventional type, not shown, positioned within reach of the operator.

The dust supply mechanism 200 shown in Figs. 11 and 12 is similar to that shown in Figs. 8 and 9, and operates in the same manner as described previously herein for the latter structure.

The housing 91 may be inverted from the downwardly discharging position shown in Figs. 11 and 12 to the position shown in Fig. 8 by removing the dusting assembly 200, releasing the link 245 from the bracket 247 on the fan housing 91, removing the trunnion axis bolt 239, inverting the housing 91 through an angle of 180° to the upwardly discharging position shown in Fig. 8, replacing the trunnion axis bolt 239, re-connecting the link 245 to the housing by means of the second bracket 247a, and then remounting the dust-feeding assembly 200 in its normal upright position as shown in Figs. 8, 9, 11 and 12. This ability to convert the machine shown in Figs. 11 and 12 for use either as an upwardly or downwardly discharging machine, as desired, is useful when the machine is required for use on both orchard and row crops.

While I have illustrated and described a preferred embodiment of the present invention, it will be understood however, that various changes and modifications may be made in the details thereof without departing from the spirit and scope of the invention as set forth in the appended claims.

Having thus described the invention, what I claim as new and desire to protect by Letters Patent is defined in the following claims:

1. In an agricultural spraying machine, a fan housing having an elongated slotted opening extending throughout a substantial portion of its periphery, and having also a closed peripheral portion, a centrifugal discharge fan wheel mounted for rotation in said housing for direct radial discharge of air blast from the fan through said peripheral housing opening and thence radially outwardly from the housing, a portion of said air blast being also directed toward said closed peripheral housing portion, means in said closed peripheral housing portion for deflecting radially directed air blast portion therein laterally toward the housing portion having said peripheral opening therein, and a duct mounted with an open inlet end thereof within the peripherally closed housing portion to receive air blast deflected by said deflecting means, said duct extending alongside and clear of the peripheral housing opening, said duct having a discharge opening in the portion thereof alongside said peripheral housing opening to feed the laterally deflected air blast within the duct into the radially directed air blast discharged directly through the peripheral housing opening.

2. In an agricultural spraying machine, a fan housing having an elongated slotted opening extending throughout a substantial portion of its periphery and a closed peripheral portion, a centrifugal discharge fan wheel mounted for rotation in said housing for direct radial discharge of an air blast through said opening, and toward said closed, peripheral housing portions, means in said closed peripheral housing portion for deflecting a radially directed air blast portion laterally toward said open peripheral housing portion, and a duct disposed along a wall of said housing portion with an open end thereof positioned to receive the laterally deflected air blast from said deflecting means, said duct also having an elongated lateral opening therein extending alongside a substantial portion of said opening to feed the deflected aid blast portion from said closed portion into the air blast discharged through said opening.

3. In an agricultural spraying machine for mounting on a vehicle, a centrifugal discharge pump comprising a housing and an impeller therein, means for mounting the pump on the vehicle with the axis of the pump impeller disposed longitudinally of the vehicle, a fan housing mounted adjacent said pump, said fan housing comprising an enclosed base, air dividing means mounted in said base, a pair of annular upper fan housing portions mounted on said base and spaced axially apart, a centrifugal discharge fan wheel mounted between said fan housing portions to rotate coaxially with the pump impeller, a nozzle support manifold mounted in the space between the front and rear fan housing portions and spaced from each thereof to provide air discharge gaps between said manifold and said housing portions, outwardly directed spray means mounted on said manifold, and an air conducting conduit disposed along an upper housing portion, said conduit having open communication with the fan housing base portion to receive an air blast portion divided from the air blast from the fan by said air dividing means, said conduit having an opening therein to communicate the interior of the duct with the gaps between the housing portions and the manifolds.

4. In an agricultural spraying machine for mounting on a vehicle, a centrifugal discharge pump comprising a housing and an impeller therein, means for mounting the pump on the vehicle with the axis of the pump impeller disposed longitudinally of the vehicle, a fan housing mounted adjacent said pump, said fan housing comprising a pan shaped base, an air dividing baffle mounted centrally of said base, a plurality of vanes in said base mounted to deflect laterally portions of an air blast divided by said baffle, a pair of annular upper fan housing portions mounted on said base and spaced axially apart, a centrifugal discharge fan wheel mounted in said housing to rotate coaxially with the pump impeller, a pair of nozzle support manifolds mounted in the space between the front and rear fan housing portions and spaced from each thereof to provide air discharge gaps between said manifolds and said housing portions, a plurality of outwardly directed spray nozzles mounted in spaced relation along said manifolds, and an air conducting conduit disposed marginally of each upper housing portion, each conduit having open communication with the fan housing base portion to receive air blasts divided by said baffle and deflected laterally by said vanes, each of said conduits having an elongated opening in the upper portion thereof to communicate the interior of the conduit with the air discharge between the housing portions and the manifolds.

5. In an agricultural spraying machine for mounting on a vehicle, a centrifugal discharge pump comprising a housing and an impeller therein, means for mounting the pump with the axis of the pump impeller disposed lengthwise of the vehicle, a fan housing mounted axially adjacent said pump, said fan housing having a closed base, and having an elongated air discharge opening in the upper portion thereof, a centrifugal discharge fan wheel mounted within said housing to rotate coaxially with the pump impeller and to discharge an air blast through said air discharge opening and into said base, spray means mounted in spaced relation along the air discharge opening in the fan housing, a conduit having open communication with the fan housing base portion and with said air discharge opening, and means for deflecting a portion of the air blast from the base portion into said conduit for release into the air blast discharged through said elongated air discharge opening.

6. In an agricultural spraying machine for mounting on a vehicle, a centrifugal discharge pump comprising a housing and an impeller therein, means for mounting the pump with the axis of the pump impeller disposed longitudinally of said trailer, a fan housing mounted adjacent said pump, said fan housing having a closed base, and having an elongated air discharge opening in the upper portion thereof, a centrifugal discharge fan wheel mounted within said housing to rotate coaxially with the pump impeller and to discharge an air blast through said air discharge opening and into said base, outwardly directed spray means mounted in spaced relation along the air discharge opening in the fan housing, a conduit having open communication with the fan housing base portion and formed to extend marginally along a side of said air discharge opening, a portion of an inner side wall of the conduit being cut away to form a bypass opening of gradually increasing width, and means for deflecting a portion of the air blast from the base portion into said conduit for release through said bypass opening into the air blast discharged through said elongated air discharge opening in the housing.

7. In an agricultural spraying machine, a fan housing having an elongated slotted opening extending throughout a substantial portion of its periphery, and having also a closed peripheral portion, a centrifugal discharge fan wheel mounted for rotation in said housing for direct radial discharge of air blast through said peripheral housing opening and thence radially outwardly from the housing, a portion of said air blast being also directed toward said closed peripheral housing portion, means in said closed peripheral housing portion for deflecting a radially directed air blast portion therein laterally toward the housing portion having said peripheral opening therein, and means for conducting the laterally directed air blast from the peripherally closed housing portion alongside and clear of the peripheral housing opening, said air blast conducting means opening into and toward said peripheral housing opening to feed laterally deflected air blast into the radially directed air blast discharged directly through the peripheral housing opening.

References Cited in the file of this patent

UNITED STATES PATENTS

| | | |
|---|---|---|
| 830,046 | Bole | Sept. 4, 1906 |
| 839,312 | Neumann | Dec. 25, 1906 |
| 995,846 | Desmarais | June 20, 1911 |
| 1,116,788 | Bell | Nov. 10, 1914 |
| 1,551,362 | Barton | Aug. 25, 1925 |
| 1,760,313 | Morgan | May 27, 1930 |
| 1,785,932 | Brown et al. | Dec. 23, 1930 |
| 1,864,198 | Johnson | June 21, 1932 |
| 2,515,792 | Ofeldt | July 18, 1950 |
| 2,545,829 | Spreng | Mar. 20, 1951 |
| 2,670,566 | Tuft | Mar. 2, 1954 |

FOREIGN PATENTS

| | | |
|---|---|---|
| 588,592 | Great Britain | May 28, 1947 |
| 672,041 | Great Britain | May 14, 1952 |